United States Patent
Sami (10) Patent No.: US 7,891,575 B2
(45) Date of Patent: Feb. 22, 2011

(54) METHOD AND APPARATUS FOR THERMAL STORAGE USING HEAT PIPES

(76) Inventor: Samuel M. Sami, 5835 Avenida Encinas #117, Carlsbad, CA (US) 92008

( * ) Notice: Subject to any disclaimer, the term of this patent is extended or adjusted under 35 U.S.C. 154(b) by 1146 days.

(21) Appl. No.: 11/592,880

(22) Filed: Nov. 3, 2006

(65) Prior Publication Data

US 2008/0104971 A1    May 8, 2008

(51) Int. Cl.
F25B 29/00 (2006.01)
F25B 27/02 (2006.01)
(52) U.S. Cl. ............. 237/12.3 R; 62/201; 62/239; 62/244; 165/10; 165/41; 165/43; 165/104.14
(58) Field of Classification Search ............ 237/12.3 R; 62/201, 239, 244, 430, 440; 165/4, 10, 41, 165/42, 43, 104.13, 104.14, 104.17, 202; F24J 3/00; F25B 27/02, 29/00; F28D 19/00
See application file for complete search history.

(56) References Cited

U.S. PATENT DOCUMENTS

| | | | | |
|---|---|---|---|---|
| 1,546,847 A | * | 7/1925 | Ljungstrom | 165/41 |
| 1,726,531 A | * | 9/1929 | Andel | 165/41 |
| 1,732,103 A | * | 10/1929 | McIntyre | 165/41 |
| 1,738,850 A | * | 12/1929 | Sunday | 165/41 |
| 1,742,873 A | * | 1/1930 | Renwick | 165/41 |
| 2,083,732 A | * | 6/1937 | Moore et al. | 96/126 |
| 3,215,193 A | * | 11/1965 | Kocher | 165/164 |
| 3,304,004 A | * | 2/1967 | Hraboweckyj | 237/12.3 R |
| 3,501,095 A | * | 3/1970 | Peterson | 237/12.3 R |
| 4,131,158 A | * | 12/1978 | Abhat et al. | 165/104.14 |
| 4,303,122 A | * | 12/1981 | Powell | 165/285 |
| 4,341,088 A | * | 7/1982 | Mei et al. | 62/239 |
| 4,355,518 A | * | 10/1982 | Beitner | 62/3.61 |
| 4,700,099 A | * | 10/1987 | Iden | 310/306 |
| 4,843,832 A | * | 7/1989 | Yamada et al. | 62/159 |
| 4,896,716 A | * | 1/1990 | Sotani et al. | 165/54 |
| 5,000,252 A | * | 3/1991 | Faghri | 165/10 |
| 5,031,690 A | * | 7/1991 | Anderson et al. | 165/43 |
| 5,195,575 A | * | 3/1993 | Wylie | 165/132 |

(Continued)

FOREIGN PATENT DOCUMENTS

CA    608895    11/1960

(Continued)

*Primary Examiner*—Steven B McAllister
*Assistant Examiner*—Daniel E Namay
(74) *Attorney, Agent, or Firm*—Sand & Sebolt (57) ABSTRACT

A thermal storage and transfer system includes a cooling system and method using ice or other frozen material with heat pipes to produce a cool airstream. Preferably, the ice is disposed in a container with the condensers and evaporators of the heat pipes respectively inside and outside the container. A fan blows air across the evaporator sections through a duct to circulate within an enclosed airspace to be cooled. A separate refrigeration system which may be used to independently cool the airspace also freezes water or another liquid to produce the ice or other frozen material in the container. The cooling system is broadly applicable, including use on motor vehicles to provide cooling for several hours when the vehicle engine is off. A heating system includes an adsorbent heat exchanger for extracting heat from exhaust gases of an engine and heating an enclosed airspace.

20 Claims, 8 Drawing Sheets

U.S. PATENT DOCUMENTS

| | | | |
|---|---|---|---|
| 5,277,038 A * | 1/1994 | Carr | 62/434 |
| 5,735,133 A * | 4/1998 | Voss et al. | 62/185 |
| 6,112,807 A * | 9/2000 | Dage | 165/202 |
| 6,253,567 B1 * | 7/2001 | Imanari et al. | 62/434 |
| 6,395,074 B1 | 5/2002 | Mastromatteo | |
| 6,631,755 B1 * | 10/2003 | Kung et al. | 165/46 |
| 6,705,938 B2 * | 3/2004 | Everhart et al. | 454/119 |
| 7,089,756 B2 * | 8/2006 | Hu | 62/435 |
| 2001/0025889 A1 * | 10/2001 | Salberg | 237/12.1 |
| 2002/0007637 A1 * | 1/2002 | Simmons et al. | 62/6 |
| 2002/0056993 A1 | 5/2002 | Kennedy | |
| 2003/0221820 A1 * | 12/2003 | Drucker | 165/202 |
| 2005/0112312 A1 | 5/2005 | Baumert et al. | |
| 2005/0167090 A1 | 8/2005 | Kennedy | |
| 2005/0252730 A1 | 11/2005 | Auer | |
| 2006/0023480 A1 * | 2/2006 | Plummer | 363/146 |
| 2006/0033077 A1 | 2/2006 | Hudgens | |
| 2008/0011866 A1 * | 1/2008 | Le Lievre | 237/12.3 A |
| 2009/0288617 A1 * | 11/2009 | Hiyama | 123/41.14 |

FOREIGN PATENT DOCUMENTS

| | | |
|---|---|---|
| CA | 632462 | 12/1961 |
| CA | 901903 | 6/1972 |
| CA | 915538 | 11/1972 |
| DE | 10142546 | 3/2003 |
| EP | 1459885 | 5/2003 |
| GB | 1267962 | 3/1972 |
| GB | 1282972 | 7/1972 |
| JP | 2001164824 | 6/2001 |
| JP | 2004019304 | 1/2004 |
| ME | 05005955 | 8/2005 |
| RU | 2231453 | 6/2004 |
| WO | WO-2004/090338 | 10/2004 |
| WO | WO-2005/108133 | 11/2005 |

* cited by examiner

METHOD AND APPARATUS FOR THERMAL STORAGE USING HEAT PIPES

BACKGROUND OF THE INVENTION

1. Technical Field

The invention relates generally to thermal storage and transfer. More particularly, the invention relates to the use of heat pipes and adsorbent materials in the transfer of thermal energy. Specifically, the invention relates to a thermal energy storage and transfer system in which heat pipes are cooled by ice or a similar frozen material in order to provide cooled air, and an adsorbent material is used to extract heat energy from hot exhaust gases to provide heated air, especially during off peak hours.

2. Background Information

The principal of thermal storage using internal melt ice-on-coil technology is widely known in industry or commercial buildings for redistributing and shaving cooling loads. In particular, ice is formed in a tank with the aid of a refrigeration system during off peak hours. Thermal energy is transferred to and from the ice by circulating brine in pipes which directly contact the ice or with water which directly contacts and melts the ice to generate cold water. In each of these applications, a pump is required to circulate fluid flow in and out of the storage zone and towards the area to be cooled. This concept works well in large scale installations where space and power are available, such as commercial buildings.

However, as noted above, these methods require circulating pumps. In addition, where brine is used, brine leaks are problematic as well as the loss of heat associated with the transport of brine or other liquid between the ice tank and the airstream to be cooled. In addition, these systems typically require a substantial amount of space which is a drawback which may prevent them from being used in many applications.

While there are a number of applications which would benefit from the elimination of the above problems, one example relates to cooling systems for motor vehicles having a compartment which is commonly used as sleeping quarters when the vehicle is not traveling. For example, recreational vehicles or cross country trucks which have extended cabs fit within this category. Particularly, with regard to truckers who are on the road an extensive amount of time and thus sleep in their cabs for convenience and to avoid the additional cost of hotels and so forth, it would be convenient to have a cooling system which operates at night or whenever the truck is parked to eliminate the requirement of running the engine during these times of rest.

In addition, fuel-powered engines, whether used on a vehicle or otherwise, produce a substantial amount of heat which is wasted and pollutants which are exhausted into the environment, causing health problems and adding to global warming. It would be a great benefit to utilize this wasted thermal energy and reduce such pollution emissions. Moreover, some states and countries have legislated or are in the process of legislating that the engines of these cross country trucks must not be operated during down times. Thus, there is a need in the art for a solution to these various above mentioned problems, all of which are addressed by the present invention.

BRIEF SUMMARY OF THE INVENTION

The present invention provides an apparatus comprising: a container; material inside the container having a freezing point no higher than 5.0° C. at atmospheric pressure; and a plurality of heat pipes having respective condenser sections disposed inside the container and respective evaporator sections disposed outside the container.

The present invention further provides a method comprising the steps of: cooling respective condenser sections of a plurality of heat pipes with frozen material having a freezing point at or below 5.0° C. at atmospheric pressure; and passing air across respective evaporator sections of the heat pipes to cool the air.

The present invention also provides a heating system useful in storing and subsequently using thermal energy extracted from engine exhaust gases.

DETAILED DESCRIPTION OF THE INVENTION

Figure 1:
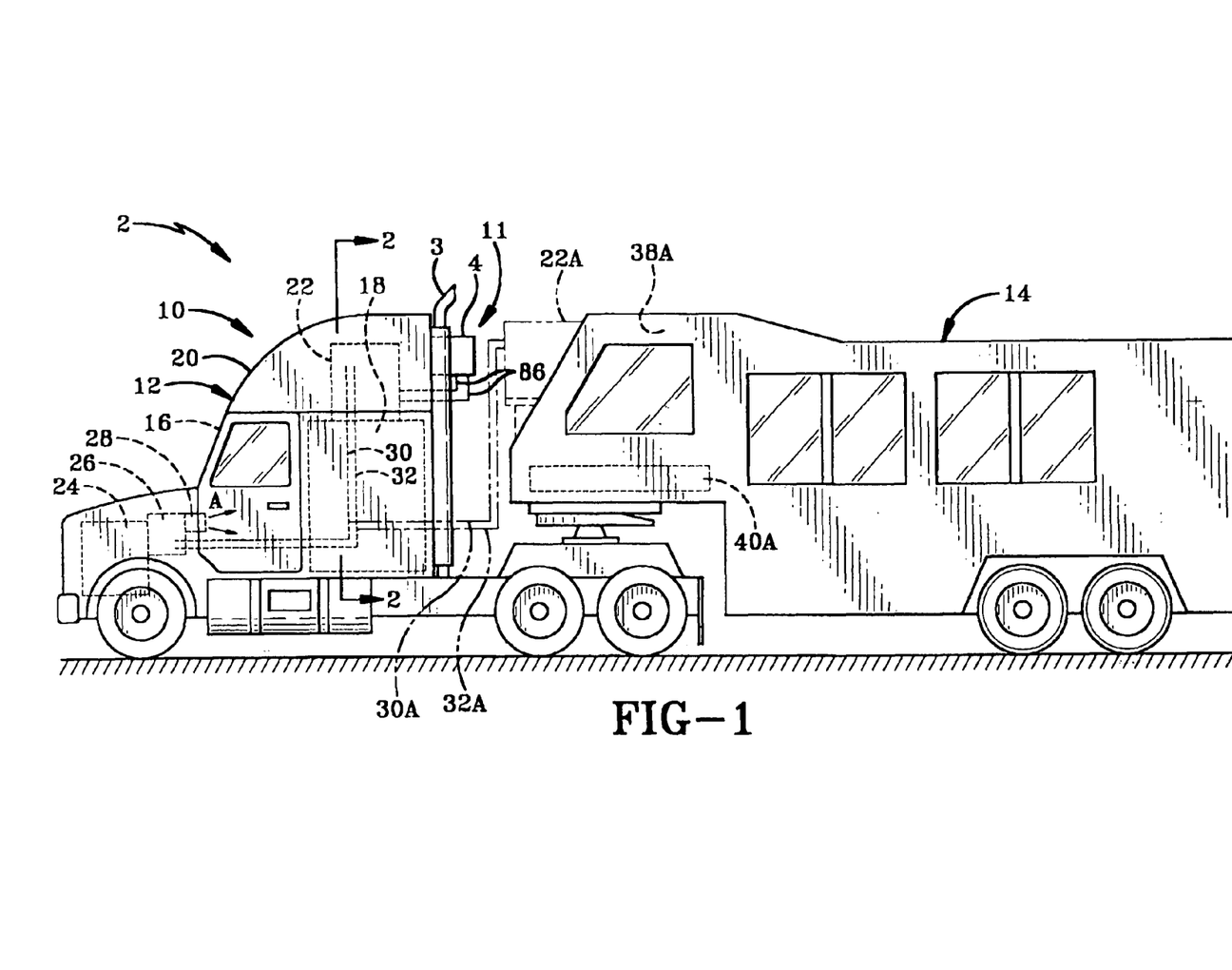
FIG. 1 is a fragmentary side elevational view of a motorized vehicle, shown as an extended cab tractor towing a recreational vehicle, with which the thermal storage and transfer system of the present invention is used.
Figure 2:
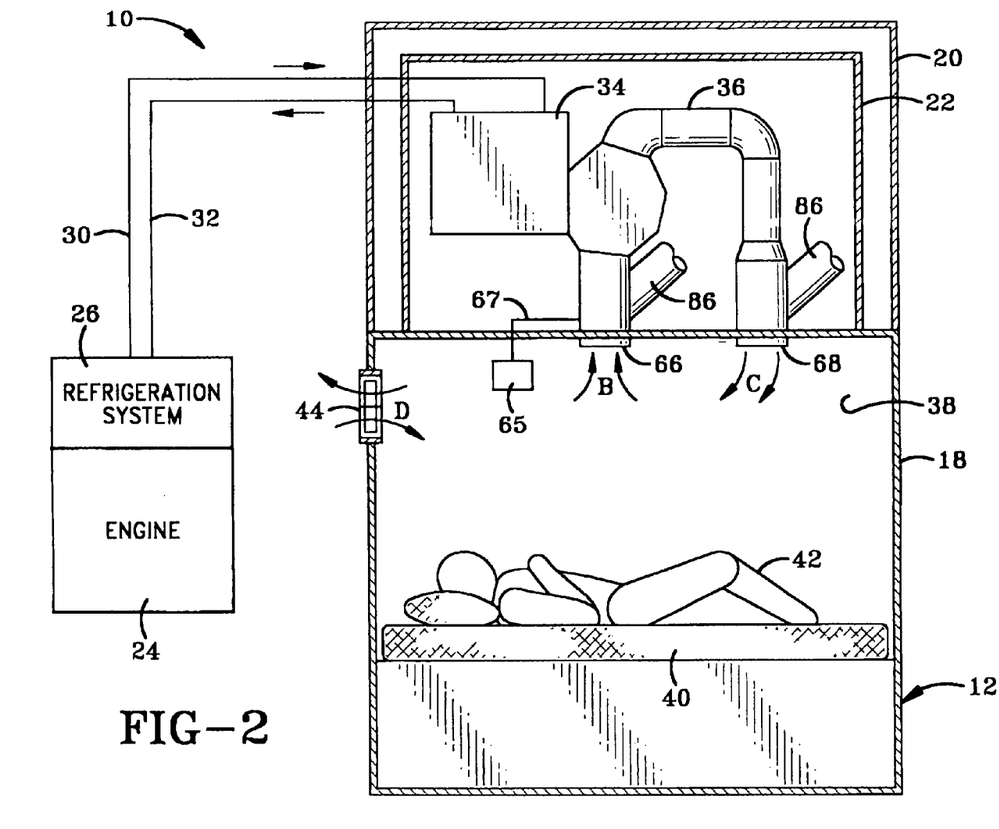
FIG. 2 is a sectional view taken on line 2-2 of FIG. 1 showing the cooling system in greater detail and the inside of the extended cab of the truck.

The thermal storage and transfer system of the present invention is shown generally at 2 in FIGS. 1-2. System 2 includes a cooling system 10 and heating system 11 and may be used in a wide variety of applications, such as with residential or commercial buildings, ships, trains, aerial vehicles and so forth. Cooling and heating systems 10 and 11 overlap with one another in the exemplary embodiment although they may be used separately as well. To simplify the description of system 2, it is shown in FIGS. 1-2 in use with a motor vehicle shown by way of example as an extended cab tractor 12 and recreational vehicle (RV) 14 mounted thereon for towing. RV 14 may also represent a trailer which is commonly used with tractor 12 as a tractor-trailer truck.

Tractor 12 includes an enclosed cab or passenger compartment which includes sleeping quarters 18 positioned rearwardly of the driver and passenger area of the cab. A hood 20 is mounted atop cab 16 with an enclosed housing 22 mounted within the interior chamber of hood 20 atop sleeping quarters 18. An engine 24 powers the truck for travel and also powers a refrigeration system 26 having at least one duct 28 in communication with the enclosed space of cab 16 to allow for the flow of cooled air as indicated at arrows A in FIG. 1 into the airspace of cab 16, which includes the space within sleeping quarters 18. Feed and return lines or conduits 30 and 32 extend between refrigeration system 26 and housing 22 as shown in FIG. 1. Alternate housing 22A shown in phantom is mounted on RV 14 with associated conduits 30A and 32A extending between refrigeration system 26 and housing 22A. In addition, an exhaust duct 3 is connected to engine 24 for exhausting the engine's hot exhaust combustion or flue gases therethrough. Heating system 11, which is described in greater detail further below, includes an insulated housing 4 mounted on duct 3 and stores thermal energy extracted from the great amount of otherwise wasted heat exhausted via duct 3 for subsequent use.

Cooling system 10 is now described in greater detail with reference to FIGS. 2-3. While system 10 is discussed with reference to housing 22 mounted on cab 16, the description likewise applies in pertinent part to housing 22A on RV 14 and conduits 30A and 32A for cooling enclosed airspace 38A inside RV 14. In accordance with the invention, conduits 30 and 32 communicate with a sealed and insulated storage container or tank 34 mounted within housing 22, as shown in FIG. 2. It is noted that tank 34 is shown atop cab 16 to simplify the drawings, and that tank 34 would more typically be under cab 16, although any suitable location may be used. A cooling duct or airstream conduit 36 is connected to tank 34 to provide a recirculation loop which includes the enclosed airspace 38 of quarters 18. This recirculation pattern is indicated at arrows B and C in FIG. 2. A bed 40 is disposed in sleeping quarters 18 on which the operator or other person 42 may rest. A bed 40A is likewise disposed in RV 14 within airspace 38A. A dehumidifier in the form of a desiccant wheel 44 is mounted on sleeping quarters 18 in communication with airspace 38 and air outside of quarters 18. Arrows D in FIG. 2 generally illustrate the operation of desiccant wheel 44, into and out of which air from airspace 38 flows in order to dehumidify the air in airspace 38.

Figure 3:
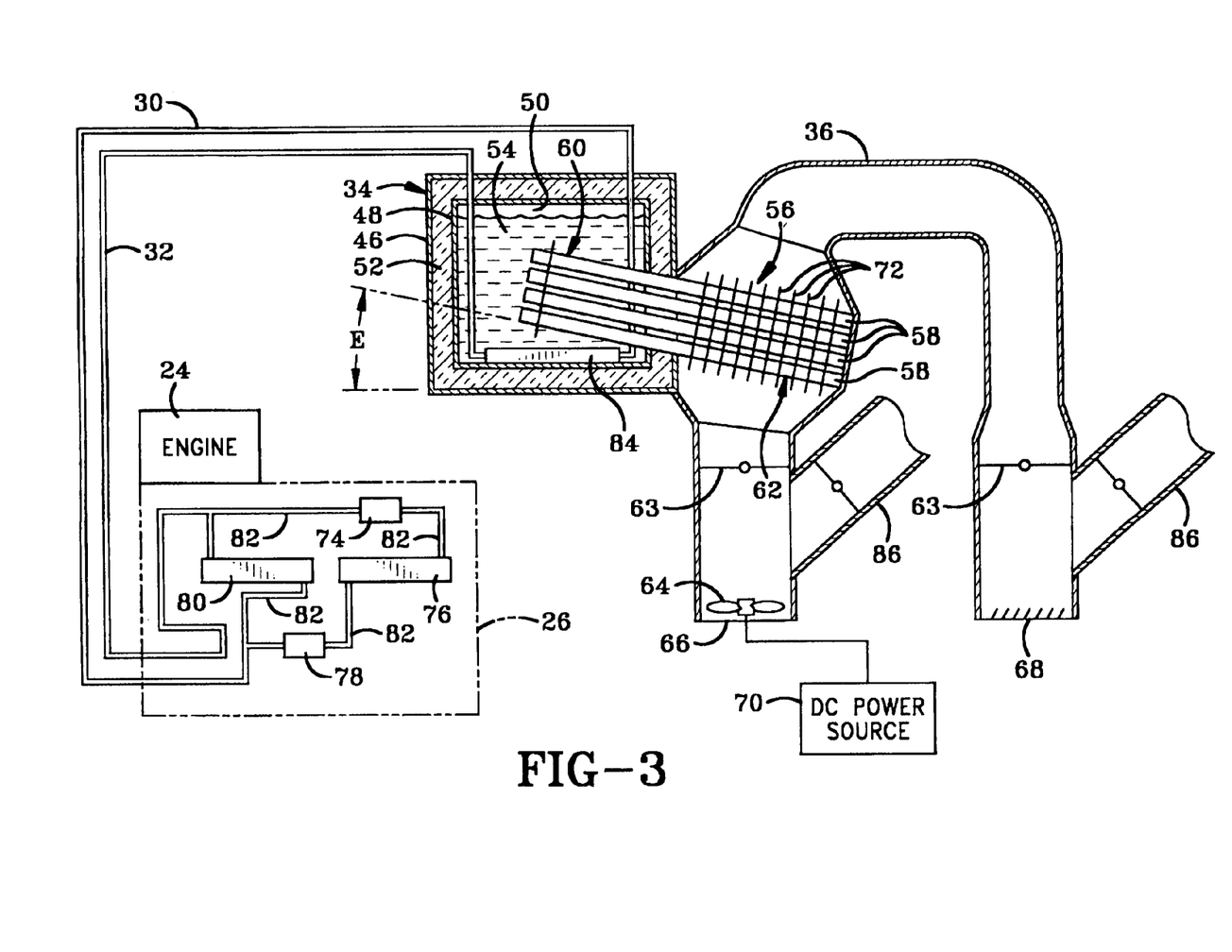
FIG. 3 is an enlarged sectional view of the cooling system with the material inside the tank in liquid form and with the engine and refrigeration system shown diagrammatically.

Referring to FIG. 3, tank 34 is a double walled chamber having an outer wall 46 and an inner wall 48 which defines therein a sealed interior chamber 50. A layer of insulation 52 is disposed between walls 46 and 48. In accordance with the invention, a material 54 is disposed within chamber 50 which is in liquid form at typical ambient temperatures as shown in FIG. 3 and which may be frozen in order to provide sustained cooling for system 10. Material 54 may simply be water and most preferably is a material which has a freezing point which is no greater than 5.0° C. Preferably, the freezing point of material 54 is no lower than −20.0° C.

Also in accordance with the invention, a heat pipe core 56 comprising a plurality of heat pipes 58 is mounted with the respective condenser sections 60 thereof within chamber 50 and the respective evaporator sections 62 thereof positioned within airstream conduit 36. Basic heat pipe configuration is described in greater detail further below. An air blower in the form of fan 64 is positioned adjacent an inlet 66 of conduit 36 for blowing air through conduit 36 across evaporator section 62 and out an outlet 68 into airspace 38. Control vanes 63 are disposed within airstream conduit 36 for controlling the air flow therethrough. A thermostat 65 is disposed within sleeping quarters 18 and in electrical communication with fan 64 via wires 67. System 10 may be configured to automatically control vanes 63 in accordance with a temperature determined by thermostat 65. Fan 64 is in electrical communication with an electric power source, for example a DC power source or battery 70 for powering operation of fan 64. A plurality of heat exchanging fins 72 are connected to evaporator section 62 for increased heat exchange during the air flow through conduit 36. Heat pipes 58 are straight tubes which form an angle E (FIG. 3) relative to the horizontal which is preferably in the range of 5.0 to 12.0 degrees.

With continued reference to FIG. 3, refrigeration system 26 comprises an air conditioning compressor 74, an air conditioning condenser 76, an expansion device 78 and an air conditioning evaporator 80 all interconnected in a standard fashion with conduits 82. Conduits 30 and 32 are in communication with conduits 82 and with an additional evaporator 84 which is disposed within chamber 50 of tank 34 in order to provide cooling to material 54 sufficient to freeze material 54. Refrigeration system 26 is thus a typical vapor compression air conditioning system commonly used in many applications, including systems in on motor vehicles powered by the engine thereof. However, any refrigeration system may be used which is suitable for cooling and freezing material 54.

Figure 4:
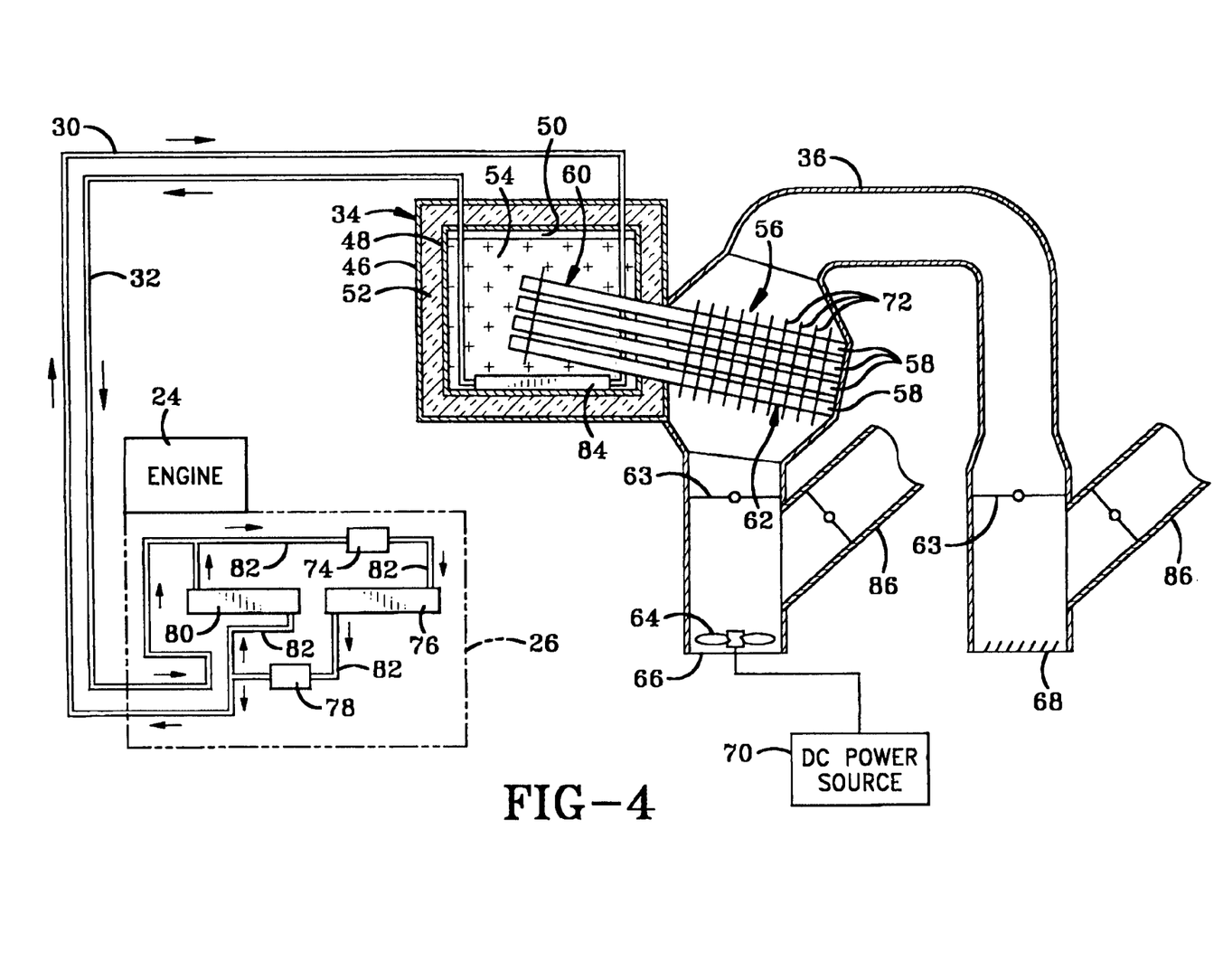
FIG. 4 is similar to FIG. 3 and shows the operation of the cooling system to freeze the material within the tank.

The operation of system 10 is now described. As shown in FIG. 3, material 54 is typically in a liquid state at atmospheric pressure under operating conditions suitable for the use of system 10, that is, when the outside temperatures are sufficiently warm in order to make system 10 desirable for use. Refrigeration system 26 is operated as indicated at FIG. 4 in order to cool material 54 via evaporator 84 in order to freeze material 54. As shown in the figures, material 54 fills most of the space of interior chamber 50 of tank 34. Most preferably, condenser sections 60 or the portions thereof which are disposed within chamber 50 are completely immersed in or surrounded by material 54 so that all of the external surfaces of condenser sections 60 which are within chamber 50 are in contact with material 54. More particularly, compressor 74 is operated to pump a liquid/gas refrigerant through the various conduits 82 and through condenser 76, expansion device 78, evaporator 80 and back to compressor 74 in the standard manner. In addition, compressor 74 pumps the refrigerant through feed line 30 and through evaporator 84 within tank 34 and via return line 32 back to compressor 74, as shown by the arrows in FIG. 4. Heat pipes 58 will provide heat transfer suitable for cooling air within a desired space even when material 54 is not frozen but is sufficiently cooler than the air to be cooled. However, it is most preferred that all or a portion of material 54 is frozen prior to use for cooling in order to provide a much greater time period of cooling.

Figure 5:
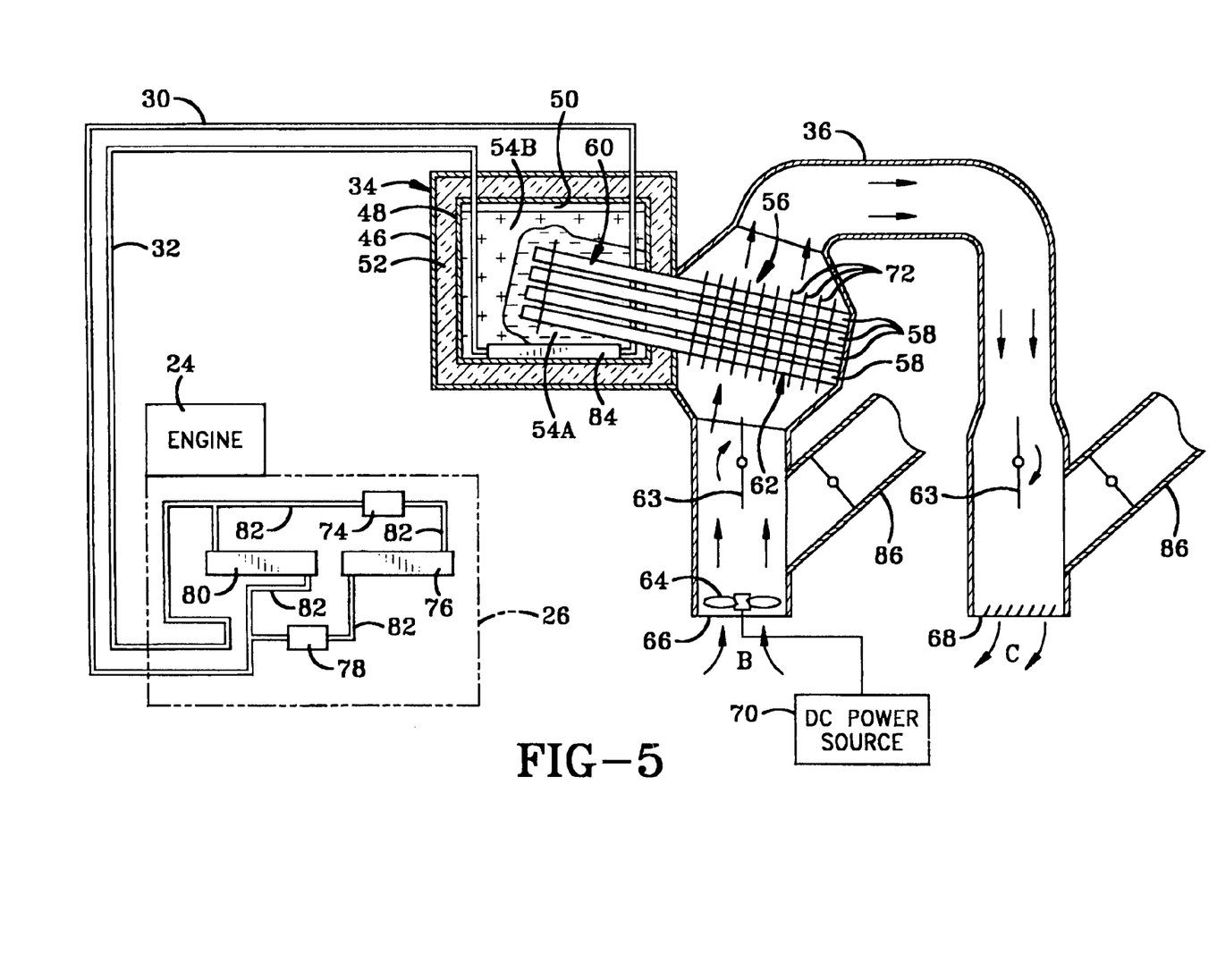
FIG. 5 is a view similar to FIG. 4 showing the recirculation of the airstream in the cooling process and the consequent melting of a portion of the material within the tank.
Figure 6:
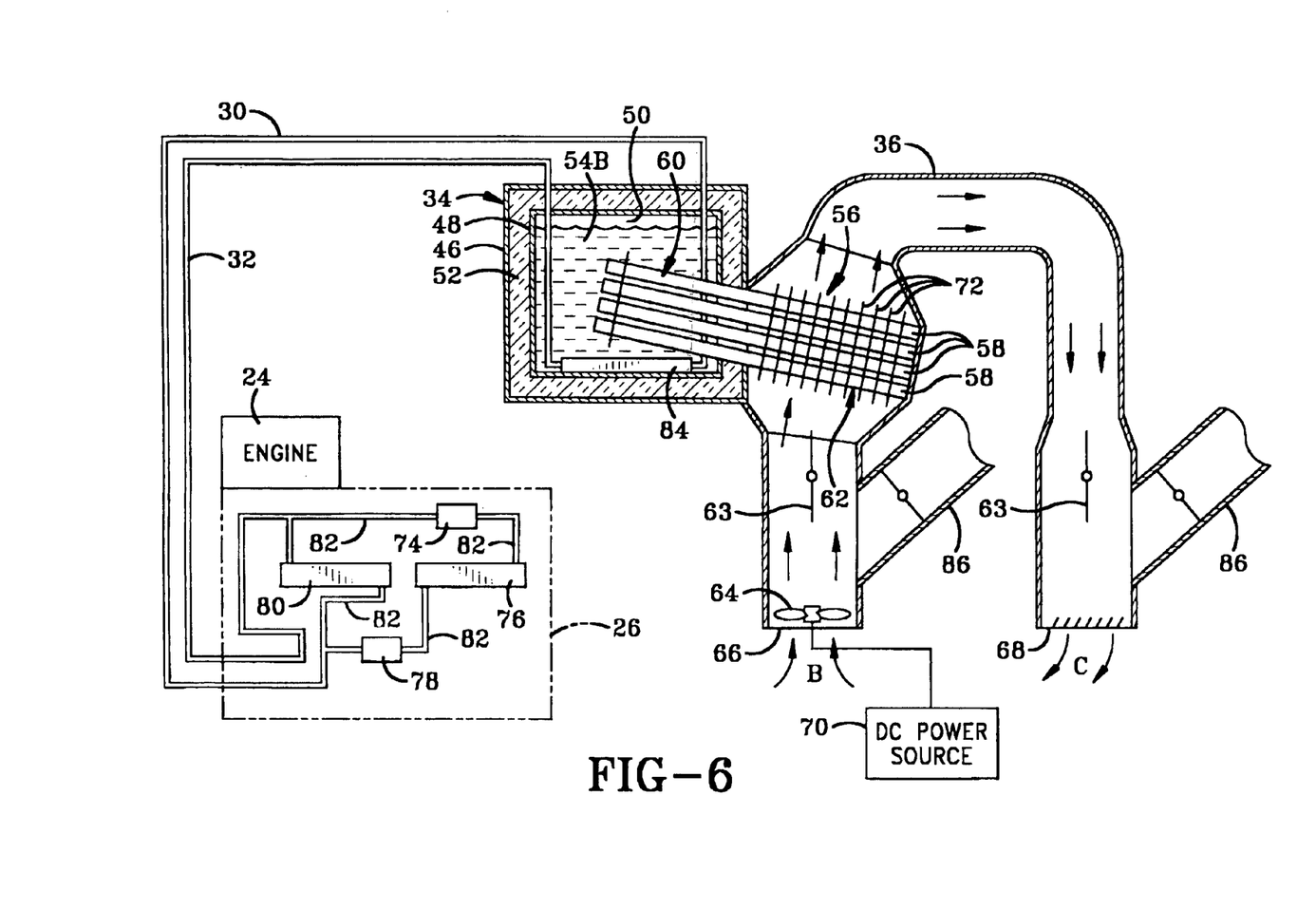
FIG. 6 is similar to FIG. 5 and shows the continued recirculation of the airstream with all of the material within the tank melted.

When desired, control vanes 63 are opened and fan 64 is operated as shown in FIG. 5 to move air from airspace 38 (FIG. 2) through inlet 66, across evaporator sections 62 and fins 72 and out of outlet 68 back into airspace 38 in a circulating pattern, as shown by the arrows in FIG. 5. Control vanes 63 and fan 64 may be manually controlled or may be configured for automatic operation via wires 67 in response to a predetermined temperature sensed by thermostat 65 (FIG. 2). As air circulates through conduit 36 and across evaporator sections 62, the working fluid within heat pipes 58 transfers heat from evaporator sections 62 to condenser sections 60 within tank 34 so that material 54 begins to melt and forms a liquid portion around condenser sections 60 as shown at 54A while the remainder of material 54 remains frozen as shown at 54B. As this circulation of air continues for a sufficient period, all of material 54 melts and thus returns to a liquid state as shown in FIG. 6. As previously noted, even in the liquid state, material 54 may still be sufficiently cool to provide some cooling depending on the temperature differential between material 54 and airstream passing through conduit 36. In any case, at the appropriate time, material 54 may be re-frozen via the process described with reference to FIG. 4 in order to prepare system 10 for another cycle of cooling at a later time. Thus, system 10 may be used in a repeated manner and may be controlled in a variety of ways to manage the load demand of thermal storage as needed in a particular environment.

In regard to tractor 12 or a similar motor vehicle, cooling system 10 will typically be set up so that engine 24 powers refrigeration system 26 while the truck is traveling and providing cooled air directly from system 26 via ducts 28 into cab 16 while system 26 simultaneously cools material 54 via evaporator 84 in order to freeze material 54 as previously noted. In a typical scenario, fan 64 will circulate air across evaporator sections 62 as previously discussed after tractor 12 has stopped and engine 24 has been shut off in order to cool airspace 38 although this may be done at any time. Thus, system 10 may provide cooling when engine 24 is not operating, eliminating fuel usage and production of combustion exhaust of engine 24 during this period, such as at night when the driver of the truck is sleeping in quarters 18.

Figure 7:
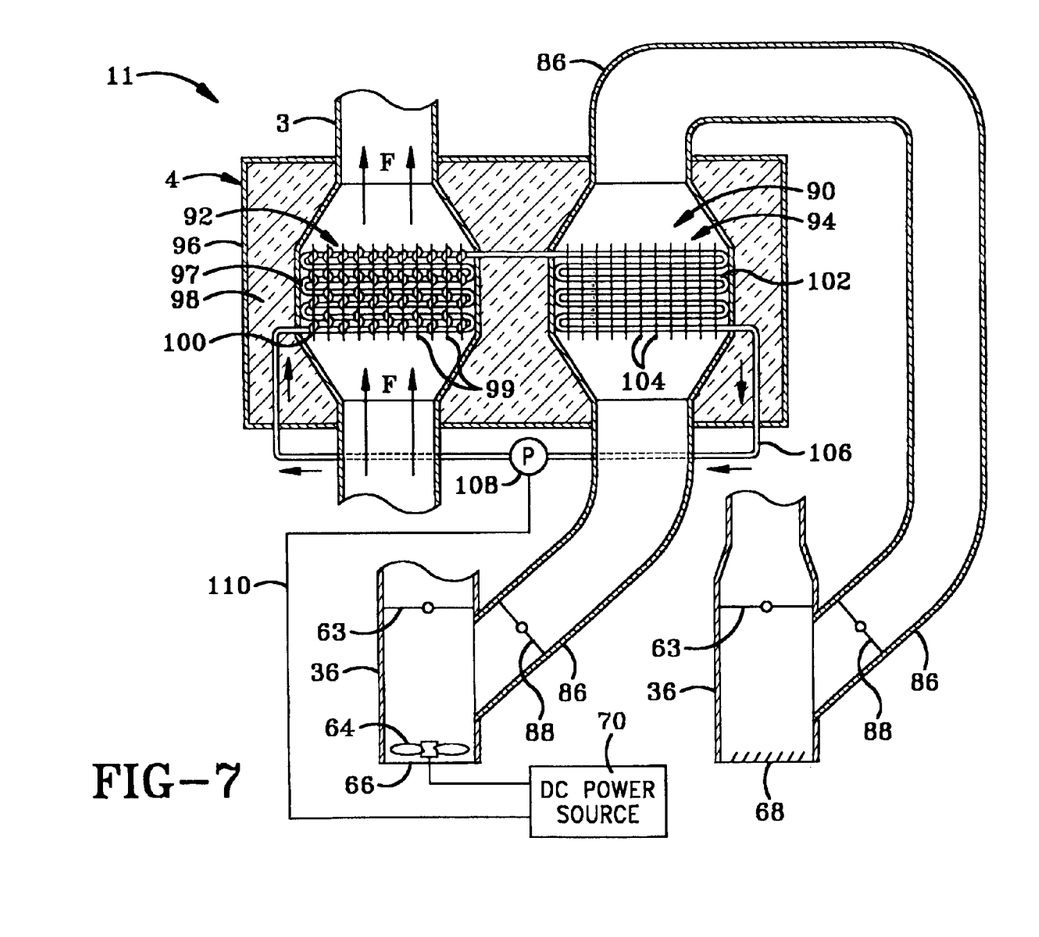
FIG. 7 is an enlarged sectional view of the heating system showing the adsorbent heat exchanger storing thermal energy transferred from the flue gases of the tractor's engine.

Referring to FIG. 7, heating system 11 is now described in further detail. A heating duct or airstream conduit 86 is connected at an inlet end thereof to cooling airstream conduit 36 adjacent inlet 66 and at an outlet end thereof to conduit 36 adjacent outlet 68. Conduit 86 thus forms a recirculation loop with portions of conduit 36 and airspace 38. Control vanes 88 are disposed within conduit 86 adjacent the inlet and outlet ends thereof.

In accordance with a feature of the invention, an adsorbent heat exchanger assembly 90 is disposed within insulated housing 4 and mounted on duct 3. Assembly 90 includes an adsorbent first heat exchanger 92 disposed inside duct 3 and a standard second heat exchanger 94 disposed outside duct 3 within airstream conduit 86. Housing includes an outer wall 96 and a layer of insulation 98. First heat exchanger 92 comprises a convoluted conduit 97, a plurality of heat exchanging fins 99 and an adsorbent material 100 embedded in multiple small blocks between fins 98 in order to provide a substantial external surface area of material 100. Adsorbent material 100 may be, for example, zeolite, active carbon, silica or any other suitable adsorbent material. Second heat exchanger 94 comprises a convoluted conduit 102 and a plurality of heat exchanging fins 104. A circulating conduit 106 is in fluid communication with first and second heat exchangers 92 and 94 and a pump 108 to provide a circulation loop for a standard coolant to flow therethrough. A typical coolant such as a glycol and water mixture is suitable for the purpose. Pump 108 is in electrical communication with DC power source 70 via wires 110.

Material 100 is activated by direct contact with engine 24 hot exhaust gases (Arrow F) moving through duct 3, said gases having a temperature when contacting material 100 typically ranging from about 400° F. to 600° F. During the flow of the exhaust gases across adsorbent material 100, it adsorbs from the exhaust gases water vapor in which thermal energy is stored. Insulation 99 helps retain heat within material 100 and the adsorbed water vapor. The extraction of heat from the exhaust gases substantially reduces the temperature of said gases and consequently reduces emission of materials which serve as pollutants.

Figure 8:
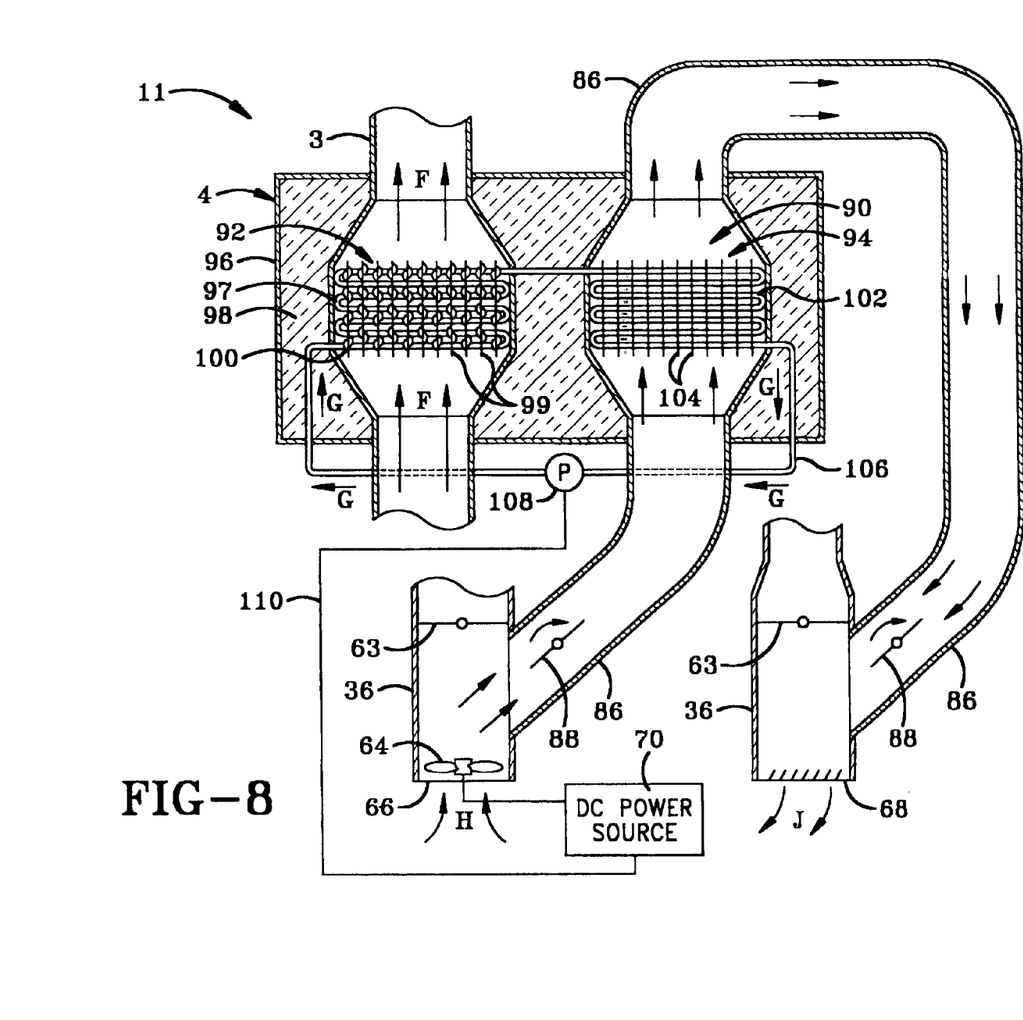
FIG. 8 is similar to FIG. 7 and shows the operation of the heating system including recirculation of the airstream in the heating process.

When it is desired to heat the air within airspace 38, pump 108 is operated to pump coolant through conduit 97, 102 and 106 (arrows G in FIG. 8) to move the coolant heated within heat exchanger 92 to heat exchanger 94, thus transferring heat from first heat exchanger 92 to second heat exchanger 94. Control vanes 88 may be opened as shown in FIG. 8 so that fan 64 circulates air through conduit 86 to be heated as it passes across heat exchanger 94 and then into airspace 38, the circulation pattern being indicated at Arrows H and J and the various arrows within conduit 86.

Thus, primarily during travel, engine 24 of tractor 12 or other such engines produce a substantial amount of heat, a large portion of which is dispersed via exhaust gases moving through duct 3 and normally wasted. Heating system 11 conveniently stores a portion of this heat energy via the adsorption of water vapor on adsorbent material 100 for subsequent transfer into airspace 38. Typically, fan 64 will circulate air across material 100 after tractor 12 has stopped and engine 24 has been shut off in order to heat airspace 38 although this may be done at any time. Thus, system 11 may provide heating when engine 24 is not operating, eliminating fuel usage and production of combustion exhaust of engine 24 during this period, such as at night when the driver of the truck is sleeping in quarters 18. As with cooling system 10, heating system 11 may be manually operated or automatically controlled in response to a temperature sensed by thermostat 65 (FIG. 2).

While heating system 11 has been described as using an adsorbent material 100, other possibilities are contemplated. Material 100 is a solid which adsorbs water vapor without itself changing phase between solid and liquid states. One of the possibilities contemplated is the use of a material such as paraffin which would change phase from solid to liquid when heated by hot exhaust gases and which would be desirable for thermal energy storage. Such a material would be contained and thus not be directly contacted by the exhaust gases.

Returning to cooling system 10 and as previously noted, while the figures show cooling system 10 in use with a motor vehicle, it may be used in a wide variety of applications such as commercial and residential buildings, health care facilities, arenas, supermarkets, cruise ships, trains and so forth. In short, system 10 may used to cool any enclosed airspace the size of which may vary substantially.

As is well known by those skilled in the art, heat pipes may be formed in a wide variety of sizes. By way of example, some heat pipes may be about 0.5 centimeters in diameter and 10 centimeters long while larger heat pipes may have a diameter of 10 centimeters or more and be several meters long depending on the purpose for which they are used. Briefly, heat pipes are typically formed of an evacuated sealed aluminum or copper tube having inner surfaces which are internally lined with a capillary wicking material and contain therein a working fluid which serves as the primary source of heat transfer. While a heat pipe is similar to a thermosyphon, it differs from a thermosyphon by virtue of its ability to transport heat against gravity by an evaporation-condensation cycle with the help of porous capillaries forming the wick or wicking material.

In short, heat enters the evaporator section of the heat pipe and causes the working fluid to evaporate, thus forming a vapor which carries heat to the condenser section of the tube where the heat is released as the vapor condenses into a liquid which subsequently travels via the wicking material to the evaporator end of the heat pipe again. This cycle continues as long as there is a temperature differential between the evaporator section and the condenser section of the heat pipe. Heat pipes are very durable and operate simply by the noted temperature differential, thus greatly minimizing maintenance and eliminating the circulating pumps discussed in the Background section of the present application.

The working fluid or refrigerant within the heat pipe can generally be of a wide variety depending on the specific conditions of use. For purposes of the present invention, one suitable refrigerant is HCFC-22 or a suitable refrigerant of the family of HFC refrigerants with boiling points similar to that of HCFC-22. However, other working fluids may be suitable for the present invention and are not limited to those noted.

The cooling system of the present invention may be configured to deliver conditioned air at various rates, for example, from 75 to 25,000 cubic feet per minute (CFM)

depending upon the space to be cooled, the size of the storage tank in which the frozen material is contained and the outside conditions. By way of example, depending on the aforementioned conditions, the cooling system of the present invention is capable of delivering an airstream with 45% to 75% relative humidity and maximum dry cool air at a temperature of 20° C. for a period of up to twelve hours or even more. As should be clear, the present cooling system may be very useful for such periods or for shorter periods as well.

As an example, at typical inlet conditions of 150 CFM at 35° C. and 50% relative humidity with the initial temperature of the tank hovering around 0° C. where ice is used as the frozen material in the tank, the heat exchange within the tank in the first hour is very high and the air leaving the downstream side of the evaporator section of the heat pipe is around 15° C., thus constituting a temperature drop of about 20° C. As the ice within the tank melts around the condenser sections of the heat pipes, the thickness of the layer of water increases and thus acts as a greater resistance to heat leaving the heat pipes to the ice, reducing the heat exchange with the air on the evaporator side of the heat pipes. The temperature differential between the entering and leaving airstream decreases until it reaches zero. At the equilibrium condition, no heat exchange takes place and the storage of energy is then completely discharged.

The use of ice or a similar frozen material thus provides an excellent cooling source for use with heat pipes because the ice temperature remains constant due to its latent heat of fusion. This constant temperature thus ensures the required temperature difference between the evaporator sections and condenser sections of the heat pipes to provide the efficient heat transfer associated with the use of heat pipes.

The present invention thus provides an inexpensive, compact, durable and efficient cooling system 10 which eliminates the circulating pumps previously discussed and leakage of brine or the like common in prior art internal melt ice-on-coil technology. In addition, heating system 11 of the present invention allows for the efficient storage of otherwise wasted thermal energy, and can be used as a stand-alone system or in conjunction with cooling system 10. Given their breadth of application, systems 10 and 11 have the potential to save vast amounts of energy while also minimizing pollutant emissions and global warming.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An apparatus comprising:
   a container;
   material inside the container having a freezing point no higher than 5.0° C. at atmospheric pressure;
   a plurality of heat pipes having respective condenser sections disposed inside the container and respective evaporator sections disposed outside the container;
   a first airstream conduit in which the evaporator sections are disposed;
   an enclosed airspace;
   an inlet and an outlet of the conduit each in communication with the airspace;
   a second airstream conduit which communicates with the enclosed airspace;
   a fuel-powered engine;
   an exhaust duct connected to the engine;
   a first heat exchanger disposed inside the exhaust duct;
   a second heat exchanger disposed in the second airstream conduit; and
   a coolant-receiving conduit extending from the first heat exchanger to the second heat exchanger.

2. The apparatus of claim 1 further comprising a de-humidifier communicating with the airspace.

3. The apparatus of claim 1 further comprising an air blower operationally connected to the evaporator sections and adapted for moving air across the evaporator sections.

4. The apparatus of claim 3 further comprising a recirculation loop in which the evaporator sections and air blower are disposed so that the air blower is adapted for recirculating air around the recirculation loop.

5. The apparatus of claim 1 further comprising a refrigeration system comprising a first portion disposed outside the container and a second portion disposed inside the container adapted for cooling the material.

6. The apparatus of claim 5 wherein the refrigeration system is powered by the fuel-powered engine.

7. The apparatus of claim 5 further comprising a mobile vehicle; and wherein the fuel-powered engine is disposed on the vehicle for powering the refrigeration system and for powering travel of the vehicle.

8. The apparatus of claim 1 wherein the first heat exchanger comprises an adsorbent material disposed inside the exhaust duct.

9. The apparatus of claim 8 wherein the adsorbent material is one of zeolite, active carbon and silica.

10. The apparatus of claim 1 wherein the first and second heat exchangers are part of a heat exchanger assembly comprising a thermal energy storage material which is adjacent the exhaust duct and changes phase from solid to liquid when heated by exhaust gases within the exhaust duct.

11. An apparatus comprising:
    a container;
    material inside the container;
    a refrigeration system which extends adjacent the container and is capable of freezing the material;
    a plurality of heat pipes having respective condenser sections disposed inside the container and respective evaporator sections disposed outside the container;
    a first airstream conduit in which the evaporator sections are disposed;
    an enclosed airspace;
    an inlet and an outlet of the conduit each in communication with the airspace;
    a second airstream conduit which communicates with the enclosed airspace;
    a fuel-powered engine;
    an exhaust duct connected to the engine;
    a heat exchanger assembly extending from the exhaust duct to the second airstream duct whereby the heat exchanger assembly is configured to transfer heat energy from the exhaust duct to the second airstream duct to heat air within the second airstream duct.

12. The apparatus of claim 11 wherein the material inside the container has a freezing point no higher than 5.0° C. at atmospheric pressure.

13. The apparatus of claim 11 wherein the heat exchanger assembly comprises an adsorbent material disposed inside the exhaust duct.

14. The apparatus of claim 11 wherein the heat exchanger assembly comprises a thermal energy storage material which is adjacent the exhaust duct and changes phase from solid to liquid when heated by exhaust gases within the exhaust duct.

15. The apparatus of claim 14 wherein the thermal energy storage material comprises paraffin.

16. An apparatus comprising:
a container;
a plurality of heat pipes having respective condenser sections disposed inside the container and respective evaporator sections disposed outside the container;
a first airstream conduit in which the evaporator sections are disposed;
material which is inside the container and is meltable in response to air moving within the first airstream conduit across the evaporator sections;
an enclosed airspace;
an inlet and an outlet of the conduit each in communication with the airspace;
a second airstream conduit which communicates with the enclosed airspace;
a fuel-powered engine;
an exhaust duct connected to the engine;
a heat exchanger assembly extending from the exhaust duct to the second airstream duct whereby the heat exchanger assembly is configured to transfer heat energy from the exhaust duct to the second airstream duct to heat air within the second airstream duct.

17. The apparatus of claim 16 wherein the material inside the container has a freezing point no higher than 5.0° C. at atmospheric pressure.

18. The apparatus of claim 16 wherein the heat exchanger assembly comprises an adsorbent material disposed inside the exhaust duct.

19. The apparatus of claim 16 wherein the heat exchanger assembly comprises a thermal energy storage material which is adjacent the exhaust duct and changes phase from solid to liquid when heated by exhaust gases within the exhaust duct.

20. The apparatus of claim 19 wherein the thermal energy storage material comprises paraffin.

* * * * *